United States Patent [19]

Siclari et al.

[11] 3,917,740
[45] Nov. 4, 1975

[54] METHOD FOR THE PRODUCTION OF POLYAMIDES BY ADDING POLYETHYLENEGLYCOL HAVING A LOW INDEX OF DISPERSION

[75] Inventors: Francesco Siclari; Bruno D'Aló, both of Milan, Italy

[73] Assignee: Snia Viscosa Societá Nazionale Industria Applicazioni Viscosa S.p.A., Milan, Italy

[22] Filed: Mar. 28, 1973

[21] Appl. No.: 345,536

[30] Foreign Application Priority Data
Mar. 31, 1972 Italy .................................. 22748/72

[52] U.S. Cl. .......................... 260/857 PG; 260/78 L
[51] Int. Cl.$^2$ ......................................... C08L 77/00
[58] Field of Search ................. 260/857 PG, 857 PT

[56] References Cited
UNITED STATES PATENTS 3,329,557  7/1967  Magat ................................. 260/857
3,475,898  11/1969  Magat ................................. 260/857
3,597,497  8/1971  Ohno .................................. 260/857
3,734,986  5/1973  Kato ................................... 260/857

FOREIGN PATENTS OR APPLICATIONS
1,167,136  10/1969  United Kingdom ................. 260/857

Primary Examiner—Paul Lieberman
Attorney, Agent, or Firm—Shlesinger, Fitzsimmons & Shlesinger

[57] ABSTRACT

An antistatic additive for polyamide fibres is disclosed, which is a polyoxyethylene having an average molecular weight of 20,000 and a very narrow range of molecular weight, the molecular dispersion index ranging from 1.02 to 1.2. The antistatic mode of action of the additive according to the invention is not completely elucidated, but outstanding and persistent antistatic properties have been experimentally ascertained. The maximum amount to be used is 0.5% by weight with respect to the polymer; higher amounts are in no wise detrimental, but afford no advantage.

7 Claims, 2 Drawing Figures

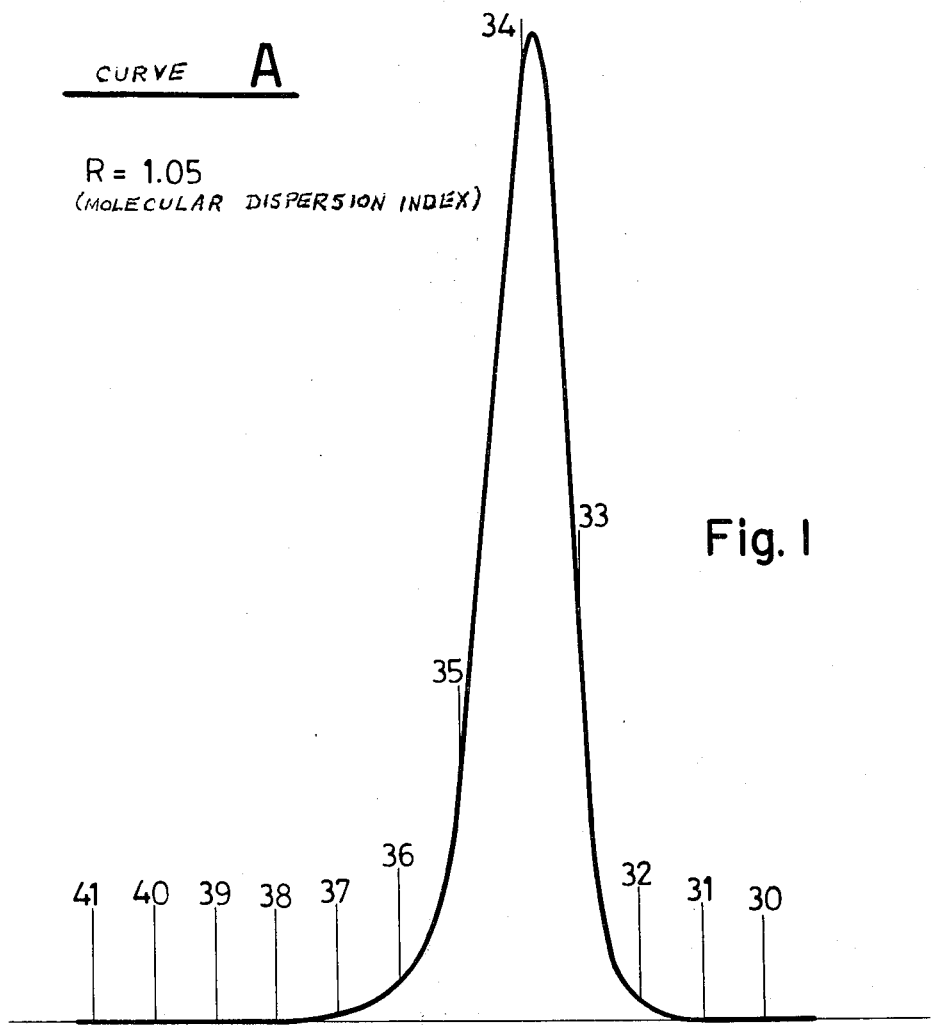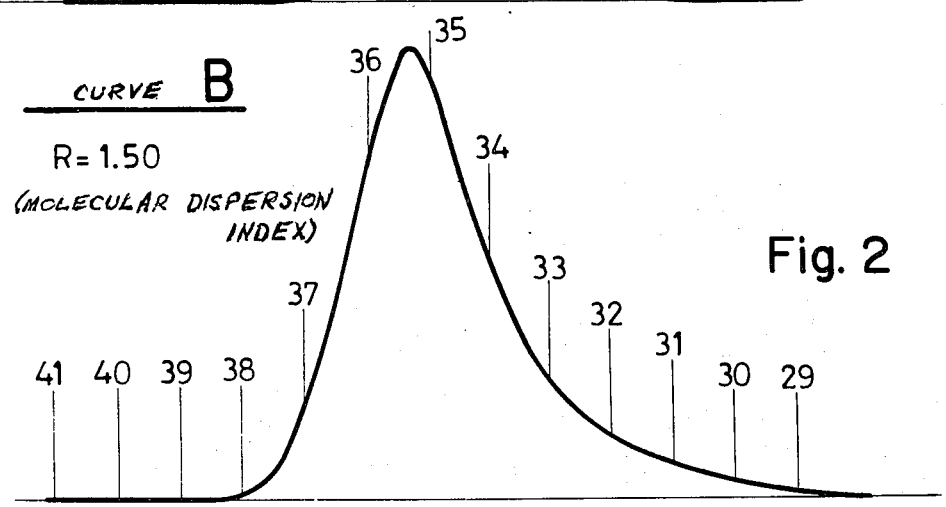

METHOD FOR THE PRODUCTION OF POLYAMIDES BY ADDING POLYETHYLENEGLYCOL HAVING A LOW INDEX OF DISPERSION

It is known that in the textile technology it is an asset to have synthetic linear polymers available, more particularly polyamides, which exhibit on a reduced scale the undesirable property of becoming loaded with static electricity when use. Especially polyamides, are polymers which exhibit to a large extent such an undesirable property and thus a number of attempts have been made in order to improve them in this respect, more particularly by employing additives which can be added to the monomers during polymerization or in a stage subsequent to polymerization and which can give rise to copolymers, or can they be contained in the polymer and the filament in a physical condition other than the polymer as such and thus as occlusions of fine size which are evenly scattered in the filament body.

More particularly, it is known, for example from the U.S. Pat. specification No. 3,475,898 to employ a water-soluble polyalkylene-ether having an appropriately high molecular weight, in such an amount as to impart to the polymer satisfactory antistatic properties. In practice, the anti-static properties thus obtained are unstable, in that a polymer of this kind is unavoidably extracted to a large extent when the fibre is washed, which produces two effects: on the one side the necessity of employing exceedingly high amounts of the additive to allow for that which will be lost in washing, and, on the other side, the formation in the fibre of empty spaces as left by the extracted additive.

A fibre or a filament having empty spaces can be accepted for certain uses but, on the other hand, is highly undesirable: at any rate, the necessity of adding a quantity of additive in excess of the one required for achieving the desired antistatic properties is both a technical and economical disadvantage.

The commonly employed polyoxyalkylene, more particularly according to the above cited Patent, is polyoxyethylene glycol, having a molecular weight from about 1,000 to 30,000 which is distributed in the filament in particulate form, the particles being elongate as a consequence of the spinning process.

It has now been found, and this is the subject matter of the present invention, that it is possible to obtain the expected improvement of the antistatic properties of polyamide in a substantially stable manner towards the action of washing, that is, such that, in spite of the long service life of the textile articles, the antistatic properties do not vary to a significant amount and without the formation of empty spaces in the filament obtained from such a polyamide. This effect is due to the fact that the additive employed to the antistatic ends according to the invention, is not extracted to a significant degree, as is shown both by the fact that significant empty spaces are not formed and by the slight variations of the antistatic indices as will be explained in more detail hereinafter.

It has been found that such a result can be achieved by employing as an antistatic additive a polyoxyethylene which is characterized by the fact that it has an average molecular weight of 20,000 and a very narrow molecular weight range, that is, a considerable molecular weight evenness. Such an eveness of the molecular weight can be defined by a numerical index (in-dex of molecular dispersion) which can be ascertained by gel-chromatographic methods, which can be carried out with an apparatus GPC Mod. 200 of the Waters Association Ing. Framingham Mass., USA (concentration of the substance in DMF : 0.2%; working temperature: 80°C).

The polyoxyethylene which is a characteristic of the invention has a molecular dispersion index of from 1.02 to 1.2.

A polymer of this kind can be generally obtained in the technology by conventional methods of fractional precipitation of a polyoxyethylene having a greater degree of molecular dispersion, when it cannot be directly purchased on the market. A polyoxyethylene as defined above is water soluble, but has the property that it cannot be extracted from the fibre so that, once it has been occluded therein, either because it has been added to the monomers in the polyamide polymerization stage, or because it has been added to the polyamide in the spinning stage or a stage appropriately preceeding spinning, it is virtually no more extracted and thus is left therein in a practically constant amount in spite of any treatment the fibre undergoes both alone and after its processing into filaments or fabrics, both in the industrial processing and in use.

It has been surprisingly ascertained that the antistatic effect as produced by the use of a polyoxyethylene as defined above is more intensive than that obtained from a common polyoxyethylene having the same average molecular weight, not only if the amounts of polyoxyethylene employed are the same, but also if the amounts of polyoxyethtlene left in the fibres after extraction by washing are the same. It can be said that the molecular fractions of the polyoxyethylene which are spaced both towards the lower and towards the higher molecular weights with respect to the average value as defined above, are negative to the ends of the antistatic treatment, both since they are extracted from the fibre, and since, even if they are left in the fibre, are comparatively inactive. The applicants cannot give a plausible explanation for such a surprising fact, but suggest that it is due to the fact that, while the low molecular weight polyoxyethylene fractions are liable to become lost in the fibre during washing, those having a molecular weight higher than the average value as defined above remain in the fibre but are inherently endowed with diminished anti-static properties, presumably since these properties require that the polymer be allowed to migrate in the fibre and be brought, at least in part, towards the surface thereof. The applicants do not deem themselves bound to this theoretical explanation of the surprising phenomenon which has been witnessed, but suggest it in that it gives a reason for the observed phenomena.

To carry out the method according to the invention, and to obtain the products according to the invention, a polyoxyethylene as defined above is employed, preferably in an amount of less that 0.5%, even though greater amounts are not detrimental and can be used but without achieving a proportional improvement of the properties of the end product which justifies such an increased amount.

The accompanying drawing shows, by way of comparison, a molecular weight distribution curve of polyoxyethylene as employed according to the invention, indicated by A, and a curve of polyoxyethylene of statistical type, such as is obtained by polymerizing ethylene oxide, indicated by B.

The way in which the invention can be worked and its advantages will become apparent from the ensuing description of a few practical examples which are not limiting. In this drawing the numerals 29 to 41 denote merely the counts resulting from the graph produced on the Waters Association equipment referred to above.

EXAMPLE 1

A vertical tube for continuous polymerization at atmospherical pressure, having a capacity of 40 liters and adapted to a daily production of 50 kgs. of polymer has been fed with the following substances:

2 kgs an hour of epsilon caprolactam 8 grs an hour of polyoxyethylene glycol (corr. to 0.40% by wt. on the caprolactam) having an ave. mol.wt. of 20,000 and a molecular dispersion index of 1.05

6 grs water, corresponding to 0.3% by wt. on the lactam.

A polymer of white color has been spun from the bottom of the tube. The tube has been maintained at the temperature of 265°C. The filament has been collected on a spool. The filaments of the spools have been collected into a single tow which has been drawn, curled and washed to remove the monomer, treated with finishing and shredded in staples according to the conventional methods for the preparation of polyamide staples. The polyamide collected from the spinneret, without finishing, had a relative viscosity in sulphuric acid of 2.40 (The relative viscosity is measured in a solution in sulphuric acid of a conc. of 96% containing 1 g of polymer in 100 mls. at 25°C). The staple thus obtained (18-denier filaments) has been converted, following the conventional processing runs, into a yarn having a metric count of 2450 Nm. The yarn has been used to make a cut pile carpet having a total weight (grams per sq. meter) of 2070, weight of the usable pile 560 gr/sq. meter, height of the usable pile 4.8 mms.

From the carpet thus manufactured, samples have been cut which have been subjected to the determination of the electrostatic charges, according to a method to be described hereinafter. (The carpet samples, called "original" in the Table I reported hereinafter, have undergone a washing for removing the finishing as previously applied to the thread. This procedure is required in that the finishing as applied to the thread has, in itself, antistatic properties). The remaining portion of the carpet has been divided into two portions, the first of which has been subjected to five repeated washings, the second to ten repeated washings with shampoo foam, according to the procedure reported hereinafter. Also from these portions, samples have been drawn, on which the electrostatic charges have been measured. The results which have been obtained are reported in Table 1, where they are compared with those obtained from similar samples cut from a nylon-6 carpet having the same textural characteristics and containing, in the same amount as the carpet made with the polyamide according to the invention, a polyoxyethylene glycol having an average molecular weight of 20,000 with a molecular dispersion index of 2.5. The same Table reports, for comparison, also the data of samples obtained in a similar manner but cut from a nylon-6 carpet having the same specifications of the previous ones but containing no antistatic additives.

EXAMPLE 2

A 200-liter autoclave has been charged with 120 kgs caprolactam, 1 kg water and 588 g of polyoxyethylene glycol having an ave. mol. wt. of 20,000 and a molecular dispersion index of 1.08 (corresponding to 0.48% on the caprolactam) and 180 grs acetic acid. The autoclave has been gradually heated to 260°C whereafter polymerization has been carried out according to conventional methods. The extruded polymer has been converted into granules having a rel. viscosity of 2.65. The granules have been washed in water, dried and melt spun in a spinneret. A 15-denier filament has been obtained, which has been drawn, curled, set and cut in staples. The staple has been converted into a yarn having an Nm of 3000 which has been used to prepare a carpet, of the cut pile type, having the following specifications;

| | |
|---|---|
| Total weight | 1680 grs/sq. meter |
| Weight of the backing | 1280 grs/sq. meter |
| Weight of the usable pile | 400 grs/sq. meter |

Samples has been prepared which have then been subjected to electrostatic tests, as explained above, both from the carpet as such and from portions of carpet subjected to repeated washings (5 or 10, respectively). The results are set forth in Table 1, where there are also illustrated by comparison the results obtained from carpet samples obtained in a manner similar to that disclosed in Example 1 (nylon-6 carpet containing in an amount of 0.48% a polyoxyethylene glycol having an ave. mol. wt. of 20,000 with a molecular dispersion index of 1.6 and a carpet which does not contain any antistatic additives).

EXAMPLE 3

Granules of polyamide, formed by nylon-6, having a rel. viscosity of 2.65, have been charged in an extruder heated at 270°C. In the connection tube between the extruder and the spinning head there has been injected by a metering pump, a polyoxyethylene glycol having an average mol. wt. of 20,000 and a molecular dispersion index of 1.1, in an amount of 1.5% on the fed in polyamide. Blending is ensured downstream of the injection by an appropriate mixing device. The spinneret has 120 holes. The filaments obtained with a filament denier of 15 have been drawn, curled, set and converted into staples. The staple has been used to make a carpet on a tufting machine having 192 needles with a gauge of 5/32 inch with 3.95 stitches per centimeter, having the following specifications:

| | | |
|---|---|---|
| Carpet weight | (yarn plus jute backing) | 1293 gr/sq. meter |
| Carpet weight | (yarn only) | 923 gr/sq. meter |
| Loop height | | 8.45 mm |

The carpet thus obtained has been dyed with acidic dyestuffs. Samples have then been taken to be subjected to electrostatic tests as indicated above, both on the dyed carpet in its original state and on portions thereof which have undergone repeated washings (5 and 10 respectively). The results have been set forth on Table 1, along with those obtained from comparison samples, which have been prepared in a manner similar to that disclosed in Example 1 (nylon-6 carpet containing, in an amount of 1.5% a polyoxyethylene glycol of an ave. mol. wt. of 20,000 and molecular dispersion index of 1.7, and nylon-6 carpet which did not contain any antistatic additives).

Table 1 reports the values obtained from 3 samples of carpet, obtained according to each of the Examples 1, 2 and 3. For each group of samples, there are also reported values obtained from two comparison groups, obtained according to the respective examples but, for a first group, with an equal amount of additive having a higher dispersion index, as indicated above, and without additives, for the second comparison group. The samples of the two comparison groups are indicated by "X" and "Z", respectively.

TABLE 1

| Samples | Original carpet | Carpet after 5 washings | Carpet after 10 washings |
|---|---|---|---|
| With 0.40 of additive according to the invention | Volts | Volts | Volts |
| 1) | 500 | 700 | 900 |
| 2) Ex. 1 | 500 | 700 | 900 |
| 3) | 500 | 750 | 900 |
| 1X | 500 | 3.000 | 8.000 |
| 2X | 550 | 2.500 | 7.500 |
| 3X | 500 | 3.000 | 8.000 |
| 1Z | 30.000 | 30.000 | 30.500 |
| 2Z | 29.000 | 29.500 | 29.500 |
| 3Z | 30.000 | 30.000 | 30.000 |
| With 0.48% of additive according to the invention | | | |
| 4) | 350 | 700 | 800 |
| 5) Ex. 2 | 400 | 700 | 800 |
| 6) | 400 | 700 | 800 |
| 4X | 400 | 2.500 | 6.500 |
| 5X | 450 | 2.000 | 7.000 |
| 6X | 500 | 2.500 | 6.500 |
| 4Z | 29.000 | 29.000 | 29.500 |
| 5Z | 29.000 | 28.500 | 29.000 |
| 6Z | 29.000 | 29.500 | 29.000 |
| With 1.5% of additive according to the invention | | | |
| 7) | 300 | 350 | 400 |
| 8) Ex. 3 | 300 | 400 | 400 |
| 9) | 300 | 350 | 350 |
| 7X | 300 | 1.800 | 5.000 |
| 8X | 350 | 1.900 | 4.300 |
| 9X | 350 | 1.850 | 5.300 |
| 7X | 27.000 | 27.500 | 28.000 |
| 8X | 28.000 | 27.500 | 28.000 |
| 9Z | 29.000 | 29.000 | 28.500 |

The method adopted for measuring the electrostatic charges on carpets having the characteristics of the preceding examples is the following:

Three circular samples are cut by a die, to a diameter of 3.81 cms. The cut samples are conditioned during 48 hours in an atmosphere having a rel. hum., of 30% and at a temperature of 22°–23°C.

The thusly conditioned samples are mounted on a W.I.R.A. Abrasimeter manufactured by HAGAYDON and CO. LTD., 93 Landsdown Road, Croydon, England CBO 2 BF. It is formed by a circular sample carrier having a diameter of 3.81 cms and a circular rubbing fabric carrier having the diameter of 14 cms. Both the sample carrier and the rubbing fabric carrier are rotated in the same direction, but their centres of rotation are not on the same axis. The disc which carries the rubbing fabric presses on the sample carrier disc with a weight of 560 grs/cm$^2$ which can be reduced to 420 grs/cm$^2$ by removing a specially provided weight supplied with the machine: the latter has a revolution counter.

The rubbing wool fabric is produced by Messrs. Straud, Riley Lord. Oswing House, Canal Road, Bradford, quality 6876 as specified in British Standard Specn. No. 11 (1963) for abrasion tests on carpets.

The conditioned samples, as specified above, are mounted on the abrasimeter by affixing them to the specially provided sample carrier whereas the wool fabric, conditioned as the sample to be tested, is affixed to the rubbing disc.

By means of a specially provided lever, the rubbing disc is lowered until it presses with its load of 560 grs./sq. cm. on the sample to be tested, then the rubbing step is started for a total of 2000 revolutions. On completion of the revolutions, the rubbing disc is lifted with the specially provided lever, whereafter the sample carrier with the sample is removed from the machine, care being taken not to touch the sample with the hands.

The sample carrier is placed on the machine flat and the value of the electrostatic charges accumulated during the rubbing with the wool fabric is measured by the apparatus Locator-Electrostatic manufactured by the Simco Company Inc. 920 Walnut Street, Lansdale, Pennsylvania, USA. The scale of this apparatus is graduated with $-10$, $0$, $+10$ indicating also the polarity of the charge. The apparatus has three sensitivity ranges which can be obtained by varying the openings which are atop the measuring probe. To determine the voltage of charges on the material, the value read on the scale is reported on a special plot where one should take into account not only the openings aforesaid, but also the distance of the sample from the measuring probe.

The tests are made both on samples of original carpet but also on carpet samples which have undergone repeated washings with a shampoo.

The shampoo washings have been made with a foam spray shampoo KEK manufactured by Salcim Brill, Milan, by operating in the following manner: after having shaken the bottle, the carpet is sprayed with foam by spreading the foam evenly by hand, two minutes stand are allowed, then, with a clean and dry cloth one rubs until completely removing the shampoo. After 30 minutes the operation is repeated so as to perform a total of five or ten washings.

We claim:

1. A method for the production of polyamides for textile usage having improved antistatic properties of high persistence in spite of wear and repeated washings, comprising
   adding to a polymeric or polymerizable amide compound, as the sole antistatic additive a polyoxyethyleneglycol, under conditions of substantial uniformity, and in an amount on a weight basis between 0.40% and 1.5%, said polyoxyethylene glycol having an average molecular weight in the order of 20,000 with all the molecules close to that weight, and high uniformity as defined by an index of molecular dispersion between 1.02 and 1.2

2. A method according to claim 1, wherein the polyoxyethylene glycol is added in an amount between 0.40% and 0.50%.

3. A method according to claim 1, wherein the polyamide is caprolactam.

4. Polyamide textile filaments and yarns having improved antistatic properties of high resistance to wear and repeated washings, containing a polyoxyethyleneglycol as the sole antistatic additive in a substantially homogeneous, even dispersion 0.4% to 1.5% of said polyoxyethylene glycol having an average molecular weight in the order of 20,000, with all the molecules close to that weight and a high uniformity as defined by an index of molecular dispersion between 1.02 and 1.2.

5. Polyamide textile filaments and yarns according to claim 4, containing 0.5% of polyoxyethylene glycol with respect to the polymer.

6. Polyamide textile filaments and yarns according to claim 4, wherein the polyamide is caprolactam.

7. As a new article of manufacture a textile article formed by polyamide filaments according to claim 4.

* * * * *